United States Patent
Ramirez et al.

(10) Patent No.: US 8,808,783 B2
(45) Date of Patent: Aug. 19, 2014

(54) MOLDED EXPANDED PELLET PRODUCT AND METHOD OF MAKING

(75) Inventors: Fernando Ramirez, Mexico City (MX); Roberto Guzman, Mexico City (MX); Anamaria Garcia, Mexico City (MX); Antonio Pacheco, Mexico City (MX)

(73) Assignee: Frito-Lay North America, Inc., Plano, TX (US)

( * ) Notice: Subject to any disclaimer, the term of this patent is extended or adjusted under 35 U.S.C. 154(b) by 226 days.

(21) Appl. No.: 13/229,131

(22) Filed: Sep. 9, 2011

(65) Prior Publication Data

US 2012/0003365 A1   Jan. 5, 2012

Related U.S. Application Data

(63) Continuation of application No. 12/172,653, filed on Jul. 14, 2008, now Pat. No. 8,048,464.

(51) Int. Cl.
| | | |
|---|---|---|
| A23P 1/14 | (2006.01) | |
| A21D 13/00 | (2006.01) | |
| A23P 1/12 | (2006.01) | |
| A23L 1/025 | (2006.01) | |
| A23L 1/01 | (2006.01) | |
| A23L 1/00 | (2006.01) | |
| A23L 1/164 | (2006.01) | |

(52) U.S. Cl.
CPC ............ *A23L 1/0076* (2013.01); *A23L 1/0128* (2013.01); *A23L 1/1643* (2013.01); *A23L 1/0088* (2013.01)
USPC ............ 426/559; 426/448; 426/465; 426/473

(58) Field of Classification Search
CPC .... A21D 13/00; A23L 1/1643; A23L 1/0088; A23L 1/0128; A23L 1/0076

USPC ......... 426/559, 448, 465, 473, 549, 503, 560, 426/94, 426, 241, 233, 244, 242, 237, 238; 219/438, 386, 771, 399, 392, 400, 411, 219/405; 99/391; 126/19; 294/265, 219; 446/481

See application file for complete search history.

(56) References Cited

U.S. PATENT DOCUMENTS 5,015,488 A * 5/1991 Van Lengerich et al. ..... 426/549
(Continued)

FOREIGN PATENT DOCUMENTS

EP   1716764 A1   11/2006
(Continued)

OTHER PUBLICATIONS http://www.food.com/recipe/whole-grain-no-bake-granola-bars-192786, Oct. 30, 2005.*

(Continued)

*Primary Examiner* — Rena L Dye
*Assistant Examiner* — Lela S Williams
(74) *Attorney, Agent, or Firm* — Colin P. Cahoon; Shaukat A. Karjeker; Carstens & Cahoon, LLP

(57) ABSTRACT

A method for making a snack product having a target shape from expandable pellets is disclosed. The snack product is formed into a target shape by expanding the pellets inside a mold. As the pellets expand inside the mold, the mold walls restrain the pellets expansion in the direction normal to the mold wall surface. The pellets also adhere to one another as they expand. An edible binder material can be included to facilitate such adherence.

19 Claims, 3 Drawing Sheets

(56) References Cited

U.S. PATENT DOCUMENTS

| | | | |
|---|---|---|---|
| 5,614,239 A * | 3/1997 | Tedesco | 426/445 |
| 2003/0138542 A1 * | 7/2003 | Malfait | 426/559 |
| 2005/0173399 A1 * | 8/2005 | Yoshidome et al. | 219/403 |
| 2008/0032006 A1 * | 2/2008 | Villagran et al. | 426/102 |
| 2008/0241332 A1 * | 10/2008 | Anand et al. | 426/560 |

FOREIGN PATENT DOCUMENTS

| | | | |
|---|---|---|---|
| GB | 2378886 A | 2/2003 | |
| WO | WO 00/78163 | * 12/2000 | A23L 1/164 |
| WO | 03/056937 A1 | 7/2003 | |

OTHER PUBLICATIONS

European Search Report dated Nov. 6, 2013 for EP Patent Application No. 09798164.1 (10 pages).

* cited by examiner

MOLDED EXPANDED PELLET PRODUCT AND METHOD OF MAKING

CROSS-REFERENCE TO RELATED APPLICATION

This application is a continuation of co-pending U.S. patent application Ser. No. 12/172,653, filed Jul. 14, 2008, the technical disclosure of which is hereby incorporated by reference in its entirety.

BACKGROUND OF THE INVENTION

1. Technical Field

The present invention relates to expanded food products and more specifically to a process for using expandable pellets or half-products to create a molded snack food product having a desired target shape.

2. Description of Related Art

Products comprising pellets which puff or expand upon microwave heating are known in the art. Such expandable pieces are generally referred to as "pellets" or "half products" in the puffed snack food art. Upon microwave heating, the pellets gradually expand to form a plurality of individual puffed pieces, each of which remain covered with a flavored coating. The half products can be made by extruding a dough into small pellets and drying the pellets to a 5% to 15% moisture range.

While the various individual snack pieces made from puffed half products known in the art are popular, it would be desirable to have even greater variety in and control over the properties of the snack foods made therefrom. A need exists for a method of producing a wider variety of snack products using expandable pellets than is currently available in the art, and for controlling the properties of snack food products made using expandable pellets.

SUMMARY OF THE INVENTION

Dry ingredients comprising starches, gums, and optionally other ingredients, such as fruit concentrates, are mixed together. The dry ingredients are hydrated and fed into an extruder. The mixture is extruded through a die orifice and the resulting extrudate is cut into pellets upon exiting the extruder. Next, the pellets are dried to a moisture content of between about 5% and about 15% such that they become a shelf-stable half-product or pellet. The half product is designed to puff and expand upon exposure to microwave or radio frequency energy. A microwave-safe mold, the interior walls of which form a target shape, is charged with a plurality of half-products and exposed to microwave energy or radio frequency energy, causing the half-products to expand and substantially fill the mold. The resulting snack product is substantially molded into the target shape when it is ejected from the mold. In some embodiments, an edible binder material is added to the mold with the pellets prior to expansion, which helps the molded snack product retain its target shape after it is ejected from the mold. The above as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
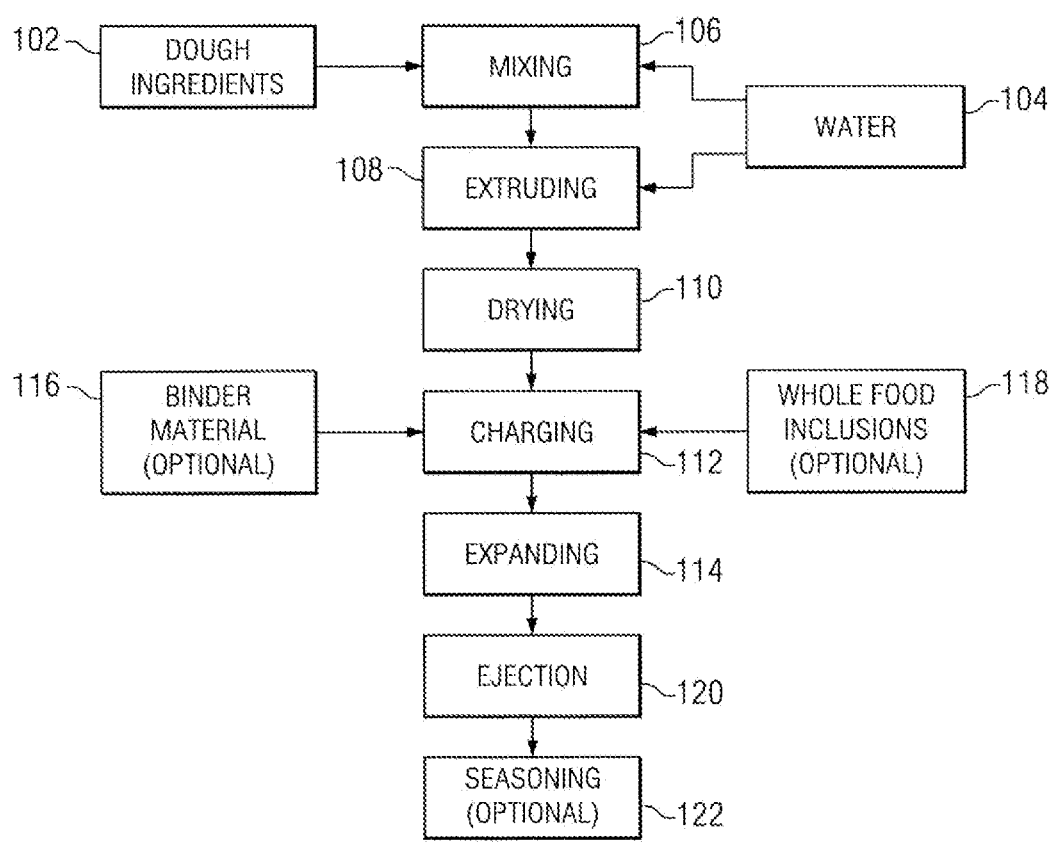
FIG. 1 is a schematic representation of the overall steps of the new process.

An embodiment of the present invention will now be described with reference to FIG. 1. Dough ingredients 102 comprising starch, such as rice flour or tapioca starch, potato flakes, gums and other ingredients are mixed together 106 with water 104 and optional ingredients, such as fruit concentrates to produce a dough. Other dough compositions can be used, as long as the dough formulation is designed to produce an extruded pellet that, after being dried, expands upon exposure to sufficient microwave of radio frequency energy. Enough water 104 is added to the dough to hydrate it to between about 25% and about 35% total moisture. All percentages used herein are by weight unless otherwise indicated. The dough is then fed into an extruder. Alternatively, the dough ingredients can be hydrated 104 to the desired moisture level while inside the extruder. The mixture is extruded 108 at high temperatures and low shear. The extrudate is cut into pellets upon exiting the extruder.

The pellets are then dried 110 to an overall moisture content of between about 5% to about 15% and more preferably about 9% to about 12% to produce a dried half-product. The dried half-product is designed to puff and expand upon application of microwave or radio frequency energy.

A mold is then charged 112 with the dried half-products. The mold is designed not to appreciably absorb microwave or radio frequency radiation and its walls are designed to remain generally rigid in the mold's target shape during microwave or radio frequency heating. After being charged with half-products, the mold is closed and subjected to microwave or radio frequency energy. The half-products inside the mold expand 114 as they absorb energy to substantially fill the mold. As they expand 114 inside the mold, the walls of the mold restrain the pellet mixture's expansion in three-dimensional space, with each wall restraining expansion in a direction normal to its surface. In one embodiment, the pellets become warm and sticky as they expand, thereby adhering to one another to form a singular, cohesive snack piece in the target shape of the mold. In another embodiment, an edible binder material 116 is added to the pellet mixture inside the mold prior to expansion in order to aid the pellets' adherence to one another and retention of the target shape. The formed snack piece is then cooled inside the mold and ejected 120. The snack piece can then optionally be seasoned 122 to taste.

The particular pellet dough formulations that can be used with the present invention include all starchy dough compositions that expand when subjected to microwave or radio frequency energy. In a preferred embodiment, the pellet dough formulations used in conjunction with the present invention include at least one hydrocolloid as an ingredient. It has been found that hydrocolloids help the pellets expand more quickly and more uniformly than prior art expanded pellets. Without being limited by a particular theory, it is theorized that hydrocolloids help to evenly and uniformly distribute moisture throughout the pellet, and increase the viscosity and elasticity of the dough, thereby increasing the gas encapsulation capacity of the dough. The uniform distribution of moisture helps the microwave energy, which energizes the polar water molecules in the dough, uniformly heat and expand the pellets. The higher elasticity of the dough allows it to expand longer without rupturing which leads to fine, uniformly distributed bubbles. Examples of particular hydrocolloids that can be used as pellet dough ingredients include natural gums such as Xanthan gum, gum arabic, as well as synthetic cellulose derivatives such as carboxymethyl cellulose (CMC).

In one embodiment of the present invention, the dry ingredients used to make the pellet dough comprise between about 85% and about 95% rice flour, less than about 1% sugar, less than about 2% sodium bicarbonate, less than about 2% monocalcium phosphate, and between about 0.5% and about 1.5% Xanthan gum. In another embodiment, the dry ingredients used to make the pellet dough comprise between about 90% and about 95% tapioca starch, between about 3% and about 9% stearic acid, and between about 0.5% and about 1.5% Xanthan gum. In still another embodiment, the dry ingredients used comprise between about 90% and about 98% rice flour, and between about 0.5% and about 1.5% Xanthan gum.

In another embodiment, fruit and/or vegetable concentrates can be included in the pellet dough formulations used with the present invention. In one embodiment, the pellet dough formulation comprises, before hydrating it to between about 25% and about 35% by weight, between about 35% and about 45% fruit concentrate (said concentrate comprising between about 40% and about 65% fruit solids), between about 0.5% and about 1.5% gum arabic, between about 45% and about 55% tapioca starch, and between about 5% and about J5% potato flakes. In a preferred embodiment, the pellet dough formulation comprises, before hydrating it to between about 25% and about 35% by weight, between about 35% and about 45% pineapple concentrate (said concentrate comprising between about 60% and about 65% solids), between about 0.5% and about 1.5% gum arabic, between about 45% and about 55% tapioca starch, and between about 5% and about 15% potato flakes. In another preferred embodiment, the pellet dough formulation comprises, before hydrating it to between about 25% and about 35% by weight, between about 35% and about 45% mango concentrate (said concentrate comprising between about 40% and about 45% solids), between about 0.5% and about 1.5% gum arabic, between about 45% and about 55% tapioca starch, and between about 5% and about 15% potato flakes. In another preferred embodiment, the pellet dough formulation comprises, before hydrating it to between about 25% and about 35% by weight, between about 65% and about 75% rice flour, between about 20% and about 30% crushed raw tomato, less than about 2% sodium bicarbonate, less than about 1% salt, and less than about 2% monocalcium phosphate.

The foregoing dough compositions are hydrated to between about 25% and about 35% total moisture content either before or during passage through an extruder. Either a single screw or twin screw extruder can be used with the present invention. The temperature of the pellet dough inside the extruder is maintained at a temperature between about 85° C. and about 140° C. in order to gelatinize the starch, and the extruder operates on the pellet dough at a shear rate of less than 1000 inverse seconds and pressure less than 100 bars. The dough so extruded is forced through a die orifice and cut into discrete pellets. During extrusion through the die orifice, the extruder conditions are maintained such that the extrudate does not experience appreciable expansion when it passes through the orifice. The dimensions of acceptable pellets are discussed in detail below in conjunction with the mold size. Therefore, the orifice size and extrudate cutting frequency (and thereby the overall pellet size) will be dictated by the dimensional considerations discussed below. The pellets cut from the extrudate comprise a moisture content of between about 25% and about 35% and more preferably between about 28% and about 32% upon exit from the extruder. In a preferred embodiment, the pellets are approximately spherical in shape.

After the pellets are cut, they are dried to an intermediate moisture content between about 5% and about 15%. More preferably, the pellets are dried to an intermediate moisture content between about 9% and about 12%. The drying can be accomplished using any method known in the art, but relatively uniform drying is preferable in order to reduce or eliminate case hardening along the exterior of the pellets. In a preferred embodiment, the pellets are dried in following sequence: First the pellets pass to a shaker dryer, which dries the pellets at a temperature of about 80° C. for approximately 2 minutes. Preferably, the shaker dryer is a four tray shaker dryer. The shaker dryer dries the pellets to a moisture content of about 20% to about 22% by drying the surface of the pellets thereby preventing compaction, stickiness, clump formation and deformation of the pellets during subsequent drying steps. Next the pellets pass through a three pass short dryer maintained at about 75° C. and approximately 70% relative humidity for about 60 minutes. The short dryer reduces the moisture content of the pellets to between about 17% and about 19%. Finally, the pellets are passed through a three pass finish dryer with temperature zones varying from about 70° C. down to about 40° C., and relative humidity varying from about 80% down to about 30%, for a total residence time of about 3 hours. In a most preferred embodiment, the dried pellets have a moisture content between about 10% and about J1%. The dried pellets can then be cooled to ambient temperature before further use. The dried pellets, or half-products, have a glassy texture and are shelf stable. They can either be stored for further use, or immediately used in the next steps of the present invention.

In the next step of the present invention, a mold is charged with plurality of half-products. In one embodiment, all of the half-products are made using a single dough formulation. In another embodiment, at least two different types of half-products, each of which is made from a different dough formulation, are mixed together before charging the mold. For example, half-products comprised primarily of rice flour can be mixed with half-products comprising fruit concentrates and tapioca starch, and placed into the mold together. Including at least two different types of half-products in this manner allows practitioners of the present invention to provide consumers with a wide variety of different textures, flavors and patterns that are not available in the prior art.

In one embodiment, the mold used to make the snack piece of the present invention is a microwave-safe mold. The term "microwave-safe mold," as that term is used herein, is defined as a mold that comprises any material that does not appreciably absorb or heat up under microwave or radio frequency energy, and which will remain generally rigid when subjected to microwave or radio frequency energy. Molds made of poly(tetrafluoroethene) (which is marketed by DuPont under the trademark Teflon®), have been found to be particularly suitable for use with the present invention. These molds have the additional benefit of providing non-stick surfaces which aid removal of the final snack product from the mold. Other examples of microwave-safe molds suitable for use with the present invention are made of plastic, glass or rigid paper.

Figure 2:
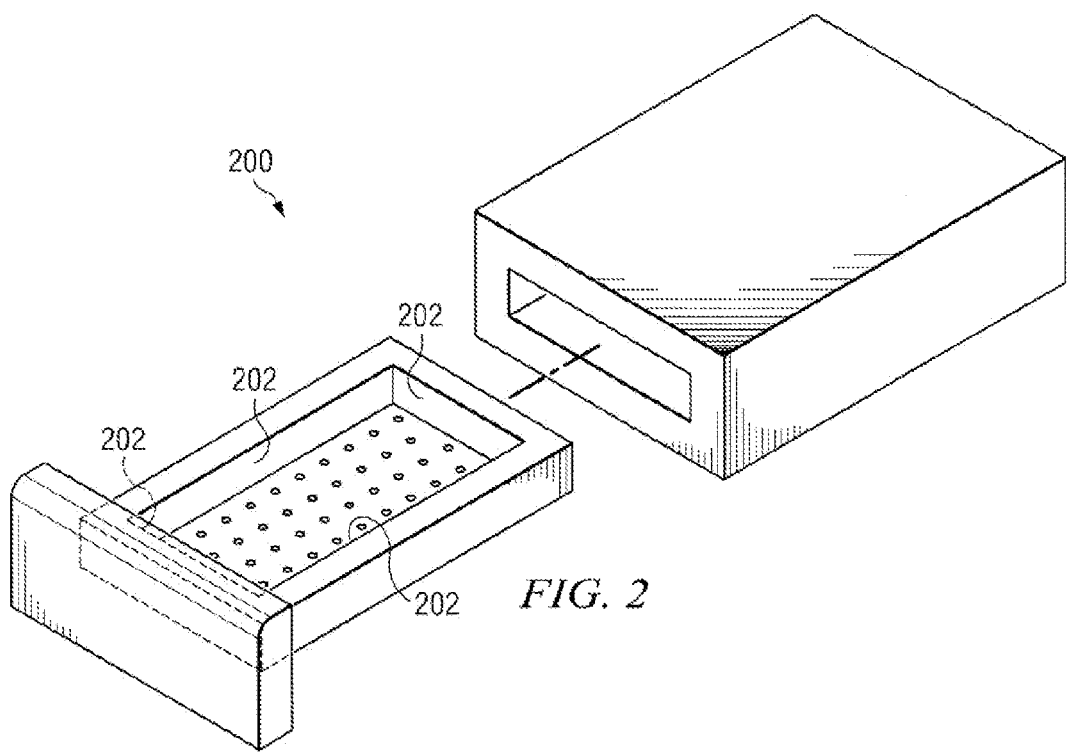
FIG. 2 is a perspective view of one mold suitable for use with the present invention.
Figure 3:
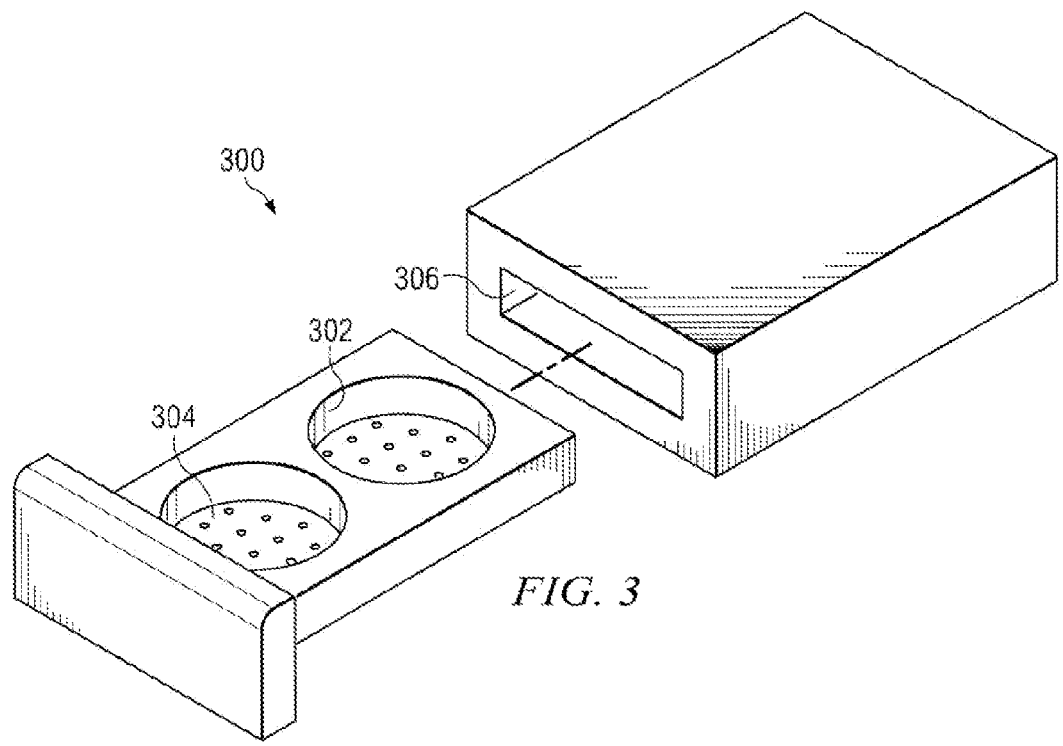
FIG. 3 is a perspective view of another mold suitable for use with the present invention.

FIG. 2 depicts one embodiment of a mold that can be used in conjunction with the present invention. The mold 200 of this embodiment comprises six (6) walls, including four (4) sidewalls 202, and is designed to produce a snack product with a target shape that is hexahedral (or, more specifically, cuboid). FIG. 3 depicts another embodiment of a mold 300 used with the present invention. In this embodiment, the mold comprises three (3) walls: a floor 304, a ceiling 306, and a curved wall 302 connecting the floor and ceiling perimeters. The target shape for this embodiment is a snack piece that is cylindrical. Generally, molds that can be used with the present invention comprise at least one wall, wherein said at least one wall comprises an enclosure designed to obtain virtually any three-dimensional target shape. The embodiments depicted in FIGS. 2 and 3 provide target shapes that are convex three-dimensional shapes. However, other embodiments of molds are possible that produce concave three-dimensional target shapes, such as a bowl target shape or an open-ended box target shape.

Furthermore, the three dimensional target shape must allow the half-products to expand and substantially fill the mold. As used herein, the term "substantially fill" when used in conjunction with the mold means that the half-products have expanded to a point where a total of at least 40%, but less than 95%, of the surface area of each wall of the mold abuts the outer surface of at least one of the expanded half-products. When the half-products have expanded to substantially fill the mold, they can also be said to have substantially obtained the mold's target shape.

Half-products will be able to substantially fill the mold in most cases where, before being expanded, all of the half-products used have a major dimension that is less than the minor dimension of the mold. The "major dimension" of a half-products, as that term is used herein, is defined as the length of the longest straight line segment having its endpoints located on the exterior surface of the half-products. The "minor dimension" of a mold, as that term is used herein, is defined as the length of the shortest straight line segment having two endpoints, with each endpoint on non-adjacent mold wall surfaces. In the case of a mold that does not have two non-adjacent walls, such as a mold with only 1 wall (a spherical mold, for example), or a mold with two walls (a conical mold, for example), the minor dimension of the mold comprises a length equal to the diameter of the largest sphere that will completely fit inside the mold. When the major dimensions of all the pellets are each smaller than the minor dimension of the mold, the pellets should be able to expand into and substantially fill all of the cavities inside the mold and obtain the target shape. In a preferred embodiment, the major dimensions of all of the pellets are each less than half the minor dimension of the mold.

In one embodiment, the half-products inside the mold are subjected to radio frequency energy. In one embodiment, the radio frequency energy is applied at a frequency between about 13 megahertz and about 40 megahertz. In a preferred embodiment, the radio frequency energy is applied at about 13.5 megahertz, about 27 megahertz, or about 40 megahertz. The power level of the radio frequency energy can range from about 0.7 kilowatts to about 100 kilowatts, depending on the equipment used. In a preferred embodiment, the radio frequency energy is applied at a frequency of about 27 megahertz and a power level of about 100 kilowatts. The residence time for the expandable pellets under radio frequency energy is between about 10 and about 35 seconds, which results in a final pellet temperature of between about 160° C. and about 180° C. In another embodiment the pellets in the mold are subjected to microwave energy at a frequency between about 900 megahertz and about 2500 megahertz. In one embodiment, the microwave energy frequency is about 2450 megahertz. In another embodiment, the microwave energy frequency is about 915 megahertz. In one embodiment, the microwave energy is applied at a power level between about 0.7 kilowatts to about 100 kilowatts. The residence time for the expandable pellets under microwave energy is between about 15 seconds and about 180 seconds.

During expansion, steam forms inside the pellets and escapes into the air. The resulting dried, expanded pellets comprise a moisture content less than about 2%. In contrast to prior art pellet mixtures designed to prevent the pellets from sticking to one another, the dried expanded pellets of the present invention also advantageously adhere to one another during the expansion process, thereby producing a plurality of expanded pellets adhered to one another in the target shape. Preferably, the expanded pellets are cooled to ambient temperature before being ejected from the mold.

Figure 4:
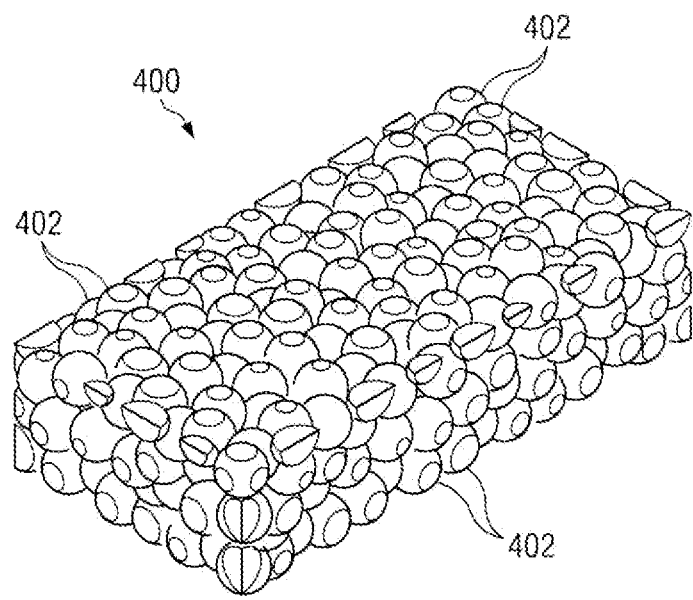
FIG. 4 is a perspective view of a snack piece made using the mold of FIG. 2.
Figure 5:
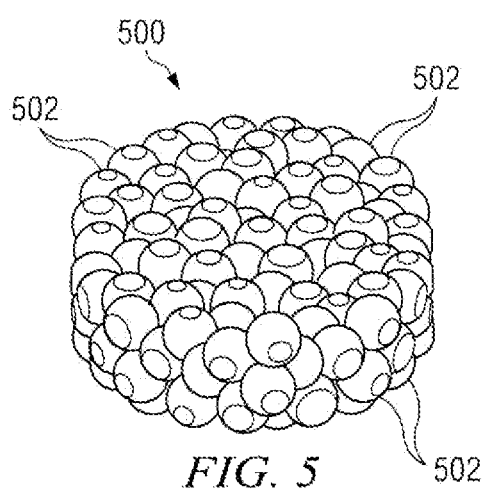
FIG. 5 is a perspective view of a snack piece made using the mold of FIG. 3.

FIG. 4 depicts one embodiment of a snack piece 400, or snack bar, made using the mold depicted in FIG. 2, in conjunction with a plurality of expandable pellets of approximately spherical shape. As depicted therein, the mold has restrained expansion of the pellets comprising the perimeter surface area of the snack piece 402 in a direction normal to said mold surface where said pellets came into contact with the mold surface during expansion. This process of restraining expansion of the pellets on the perimeter of the snack piece 400 creates a snack bar having an approximately cuboid target shape. FIG. 5 depicts another embodiment of a snack piece 500, or snack bar, made using the mold depicted in FIG. 3, in conjunction with a plurality of expandable pellets of approximately spherical shape. The mold of FIG. 3 has restrained expansion of the pellets at the mold wall surfaces 502, and created a snack bar 500 having a cylindrical target shape. Other target shapes are possible in other embodiments with other mold shapes.

In one embodiment, whole food inclusions are optionally charged into the mold cavity along with the expandable pellets described above. Examples of whole food inclusions are whole grains such as whole kernels of corn, whole rice grains, whole wheat grains, whole oat grains, and whole amaranth grains. Preferably, the starch inside the whole grains has been gelatinized prior to charging the mold. Some of the whole grains will expand inside the mold during microwave or radio frequency heating along with the expandable pellets. Additionally, whole food inclusions can comprise pieces of dehydrated fruit, cooked egg, cooked beans, peanuts, almond or other nuts. Whole food inclusions can allow practitioners of the present invention to adjust the nutrient content of the final snack piece, and provide consumers a snack piece with various visual and flavor characteristics.

In one embodiment, an edible binder material is optionally included in the mold cavity along with the expandable pellets described above. The edible binder material can comprise an aqueous binder solution containing at least one of natural gums, artificial gums, sugar, glucose, cellulose, corn starch and corn syrup solids. In a preferred embodiment, the edible binder material is a 2% aqueous solution of pregelatinized corn starch. In another preferred embodiment, the edible binder material is a 1% aqueous solution of Xanthan gum. When an aqueous binder material described herein is included in the mold with the dried pellets, it is preferably included at a weight percent of between about 1% and about 3% relative to the total weight of the dried pellets in the mold. The edible binder material can also comprise edible materials that are solid or semi-solid at room temperature. In a preferred embodiment, the edible binder material comprises glucose with approximately 40 Dextrose Equivalence. Glucose can be included in the mold at a weight percent between about 0.5% and about 1% based on the total weight of the dried pellets inside the mold. In a most preferred embodiment, the edible binder material comprises corn syrup solids. The corn syrup solids can be included in the mold at a weight percent between about 1% and about 3% based on the total weight of the dried pellets inside the mold. The edible binder material helps the expanded pellets adhere to one another during expansion and retain the target shape, which corresponds to the interior of the mold.

Topical seasoning 122, topical oil, and salt or sugar can be added to the snack piece, and the finished product can be packaged for consumer use.

The following Examples are presented to further illustrate making and using the compositions of this invention. These Examples are not to be construed as limiting.

Example I

Ingredients comprising about 89.5% rice flour, about 0.64% sugar, about 1.27% sodium bicarbonate, about 1.6% monocalcium phosphate, about 1% Xanthan gum was mixed together and hydrated to form a dough comprising a moisture content of about 32%. The dough was extruded and face cut into 4 nun diameter pellets with a gel texture. The pellets comprised a moisture content of about 25% by weight. The pellets were then dried. First the pellets passed to a continuous four tray shaker dryer, which dried the pellets at a temperature of about 80° C. for approximately 2 minutes. The shaker drier dried the pellets to a moisture content of about 20% to about 24%. Next the pellets passed through a three pass short dryer maintained at about 75° C. and approximately 70% relative humidity for about 60 minutes. The short dryer reduced the moisture content of the pellets to between about 17% and about 19%. Finally, the pellets were passed through a three pass finish dryer with temperature zones varying from about 70° C. down 20 to about 40° C., and relative humidity varying from about 80% down to about 30%, for a total residence time of about 3 hours. The dried pellets were then cooled to ambient temperature.

Approximately 10 grams of dried pellets were then charged into a microwave safe mold along with 0.2 grams of an edible binder comprising corn syrup solids. The microwave safe mold was made of Teflon® and had interior walls with a cuboid target shape. The target shape of the mold walls had a length of 5.5 cm, a width of 2 cm, and a height of 1 cm. The charged mold was then subjected to microwave energy at a frequency of about 2450 MHz at a power level of about 1.560 kilowatts in a consumer grade microwave oven for between about 15 and about 30 seconds until the mold was substantially filled with expanded pellets. The expanded pellets were then cooled inside the mold from their final temperature of about 170° C. down to ambient temperature before being ejected from the mold. The snack piece comprised expanded pellets that adhered to one another substantially in mold's cuboid target shape.

Example 2

Dried pellets were prepared as in Example I above. A microwave safe mold having a cylindrical target shape was charged with approximately 16 grams of pellets. The cylindrical target shape had a radius of approximately 4 cm and a height of approximately 1 cm. The pellets were expanded, cooled, and ejected from the mold. The pellets adhered to one another to produce a snack piece substantially having said cylindrical target shape.

The instant invention provides several advantages over the prior art. First, a pellet or half-product is provided that more uniformly expands when subjected to microwave or radio frequency energy due to the inclusion of hydrocolloids in the dough. Second, while the prior art is primarily concerned with maximizing the expansion of the pellets, the present invention actually restrains the expansion of the pellets in at least one direction so that a plurality of pellets adhere to one another and form a singular, cohesive snack product. For example, small spherical pellets can be placed into a cuboid shaped mold and expanded. The pellets that come into contact with the mold walls are restrained from expanding in that direction, forming the final snack piece into the desired cuboid shape. The prior art has not attempted or suggested this. Third, pellets with different formulations can be mixed together before charging the mold. The present invention can thereby provide a consumer with a variety of flavors and distinct patterns in a single, cohesive snack piece that is not available in the prior art. Such products are desirable because they can be easily packaged by a manufacturer and consumed by a consumer. Hence, the present invention provides a way for a new product line that can not only compete with snack bars and other unitary, cohesive snack foods, but can provide a greater variety of distinct flavors, textures, patterns or styles.

While the invention has been particularly shown and described with reference to a preferred embodiment, it will be understood by those skilled in the art that various changes in form and detail may be made therein without departing from the spirit and scope of the invention.

What is claimed is:

1. A method of making a snack piece, said method comprising the steps of:
   extruding a dough into a pellet;
   drying said pellet to an intermediate moisture content between about 5% and about 15% by weight to produce a half-product;
   selecting a rigid mold, the mold comprising a first mold portion and a second mold portion, the first mold portion having a cavity therein;
   charging the cavity with a plurality of said half-products;
   closing the rigid mold by sliding the first mold portion into the second mold portion, the second mold portion covering the cavity such that the half-product-charged cavity is completely surrounded by walls of the rigid closed mold, the surrounding walls defining a target shape; and
   producing said snack piece in a substantially target shape by restrictively expanding said half-products against the surrounding walls of said closed rigid mold such that at least 40%, but less than 95%, of the surface area of each wall of the closed mold abuts an outer surface of at least one of said expanded half-products in said closed mold, and by adhesion of half-products to each other in the closed mold.

2. The method of claim 1 wherein said charging further comprises charging said mold with a plurality of half-products comprising at least two different half-product formulations.

3. The method of claim 1 wherein said mold comprises a microwave-safe mold, and wherein said expanding further comprises exposing said mold to microwave energy or radio frequency energy.

4. The method of claim 3 wherein said microwave-safe mold comprises at least one of poly(tetrafluoroethene), plastic, glass and rigid paper.

5. The method of claim 3 wherein said radio frequency energy comprises radio frequency energy at a frequency between about 13 megahertz and about 40 megahertz, and a power level between about 0.7 kilowatts and about 100 kilowatts.

6. The method of claim 3 wherein said radio frequency energy comprises radio frequency energy at a frequency of about 27 megahertz and a power level of about 100 kilowatts.

7. The method of claim 5 wherein said expanding further comprises exposing said mold to radio frequency energy for a residence time between about 10 and about 35 seconds.

8. The method of claim 3 wherein said expanding further comprises heating said half-products to a temperature between about 160° C. and about 180° C.

9. The method of claim 3 wherein said microwave energy comprises microwave energy at a frequency between about 900 megahertz and about 2500 megahertz, and a power level between about 0.7 kilowatts and about 100 kilowatts.

10. The method of claim 9 wherein said expanding further comprises exposing said mold to said microwave energy for a residence time between about 15 and about 180 seconds.

11. The method of claim 1 wherein said target shape comprises at least one of a hexahedron, a cuboid, and a cylinder.

12. The method of claim 1 wherein said target shape defined by said surrounding walls comprises a convex shape or a concave shape.

13. The method of claim 1 wherein said charging further comprises charging said mold with an edible binder material.

14. The method of claim 13 wherein said edible binder material comprises an aqueous solution comprising at least one of natural gums, artificial gums, sugar, glucose, cellulose, and corn syrup solids.

15. The method of claim 13 wherein said edible binder material comprises between about a 1% and about a 3% aqueous solution.

16. The method of claim 13 wherein said charging further comprises charging said mold with said edible binder material at a weight percent between about 1% and about 3% based upon the total weight of said plurality of said half products.

17. The method of claim 1 wherein said charging further comprises charging said mold with whole food inclusions.

18. The method of claim 17 wherein said whole food inclusions comprise at least one of whole kernels of corn, whole rice grains, whole wheat grains, whole oat grains, whole amaranth grams.

19. The method of claim 17 wherein said whole food inclusions comprise pieces of at least one of dehydrated fruit, cooked egg, cooked beans, and nuts.

* * * * *